Nov. 12, 1963    G. B. LONG    3,110,170
DRY CLEANER FILTRATION ARRANGEMENT
Filed June 28, 1961    4 Sheets-Sheet 1

INVENTOR.
George B. Long
BY
Frederick M. Ritchie
HIS ATTORNEY

Nov. 12, 1963  G. B. LONG  3,110,170
DRY CLEANER FILTRATION ARRANGEMENT
Filed June 28, 1961  4 Sheets-Sheet 2

INVENTOR.
George B. Long
BY
Frederick M. Ritchie
HIS ATTORNEY

Nov. 12, 1963  G. B. LONG  3,110,170
DRY CLEANER FILTRATION ARRANGEMENT
Filed June 28, 1961  4 Sheets-Sheet 3

INVENTOR.
George B. Long
BY
Frederick M. Ritchie
HIS ATTORNEY

INVENTOR.
George B. Long
BY
Frederick M. Ritchie
HIS ATTORNEY

United States Patent Office 3,110,170
Patented Nov. 12, 1963

3,110,170
DRY CLEANER FILTRATION ARRANGEMENT
George B. Long, Dayton, Ohio, assignor to General Motors Corporation, Detroit, Mich., a corporation of Delaware
Filed June 28, 1961, Ser. No. 120,420
6 Claims. (Cl. 68—12)

This invention relates to a domestic appliance and more particularly to an improved solvent system for dry cleaning apparatus.

Solvent usage constitutes a major concern in the operation of dry cleaning apparatus. Various elaborate arrangements have been devised to reclaim the maximum amount of solvent. In a replaceable filter system such as taught in the copending application Serial No. 105,733, filed April 26, 1961, and assigned to the same assignee, it is desirable to rid the filter cartridge of as much solvent as possible before the cartridge is disposed of.

Accordingly it is an object of this invention to eliminate solvent from an expendable dry cleaning filter.

Another object of this invention is the provision of a heater associated with a filter casing to vaporize solvent absorbed by a disposable filter cartridge in the casing.

It is another object of this invention to provide dry cleaning apparatus with a control circuit for selectively energizing a heater to reclaim solvent from a filter by vaporization and condensation when the apparatus is inoperative.

A further object of this invention is the provision in a solvent circulation system of a by-pass arrangement for a replaceable filter which prevents carry over of filter particles to the area where the solvent is to be used.

Further objects and advantages of the present invention will be apparent from the following description, reference being had to the accompanying drawings wherein preferred embodiments of the present invention are clearly shown.

Figure 1:
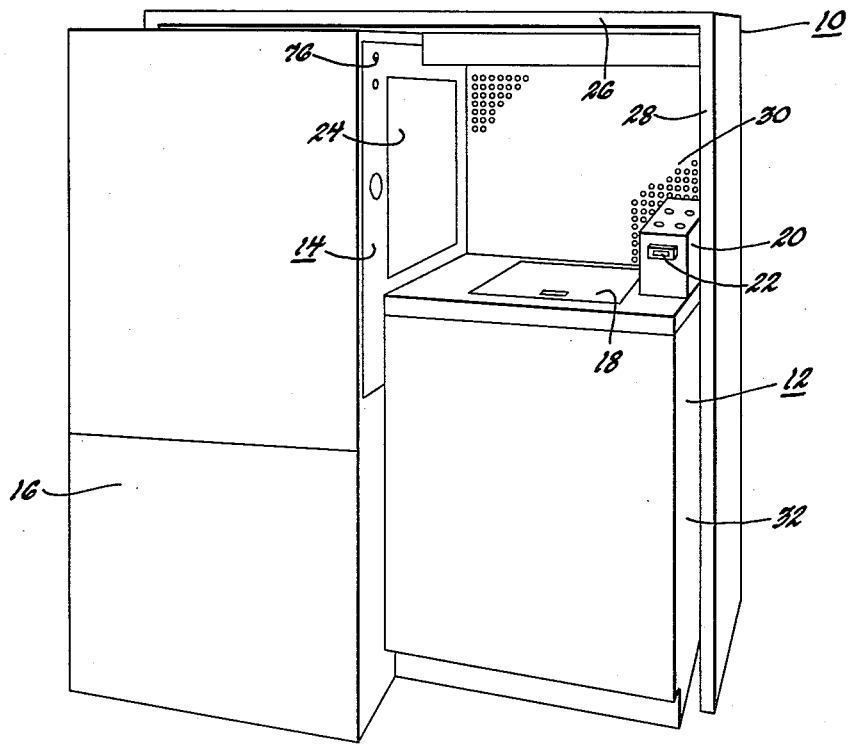
FIGURE 1 is a perspective front view of a coin-operated dry cleaning system provided with this invention.

In accordance with this invention and with reference to FIGURE 1, a coin-operated dry cleaning system is pictorially illustrated. The system includes an outer cabinet 10 for partially enclosing a clothes washer or agitating apparatus 12 and a clothes dryer or drying apparatus 14. Note that the clothes dryer 14 is elevated above the floor to provide for a filter compartment cabinet 16 therebelow. The clothes washer 12 has a top access door 18 which is pivotally openable for inserting and removing fabrics from the washer. A coin box 20 is positioned on the clothes washer and provided with a coin slot 22 through which the required fee is placed to condition the equipment for a complete dry cleaning cycle including washing and drying.

The clothes dryer 14 has a front access opening 24 which faces the washer access opening 18 adjacent one side thereof. This arrangement places the access doors 18 and 24 in a confined area defined by a top wall 26 and a sidewall 28 of the dry cleaning cabinet 10—a perforate grill 30 at the rear of the confined space operating to withdraw fumes from the area whenever either access door 18 or 24 is opened. The outlet or vent grill 30 is connected through a venting system at the rear of the cabinet to the atmosphere as set forth more fully in the commonly assigned copending application Serial No. 105,-733, filed April 26, 1961, and wherein similar components have the same reference characters.

Figure 2:
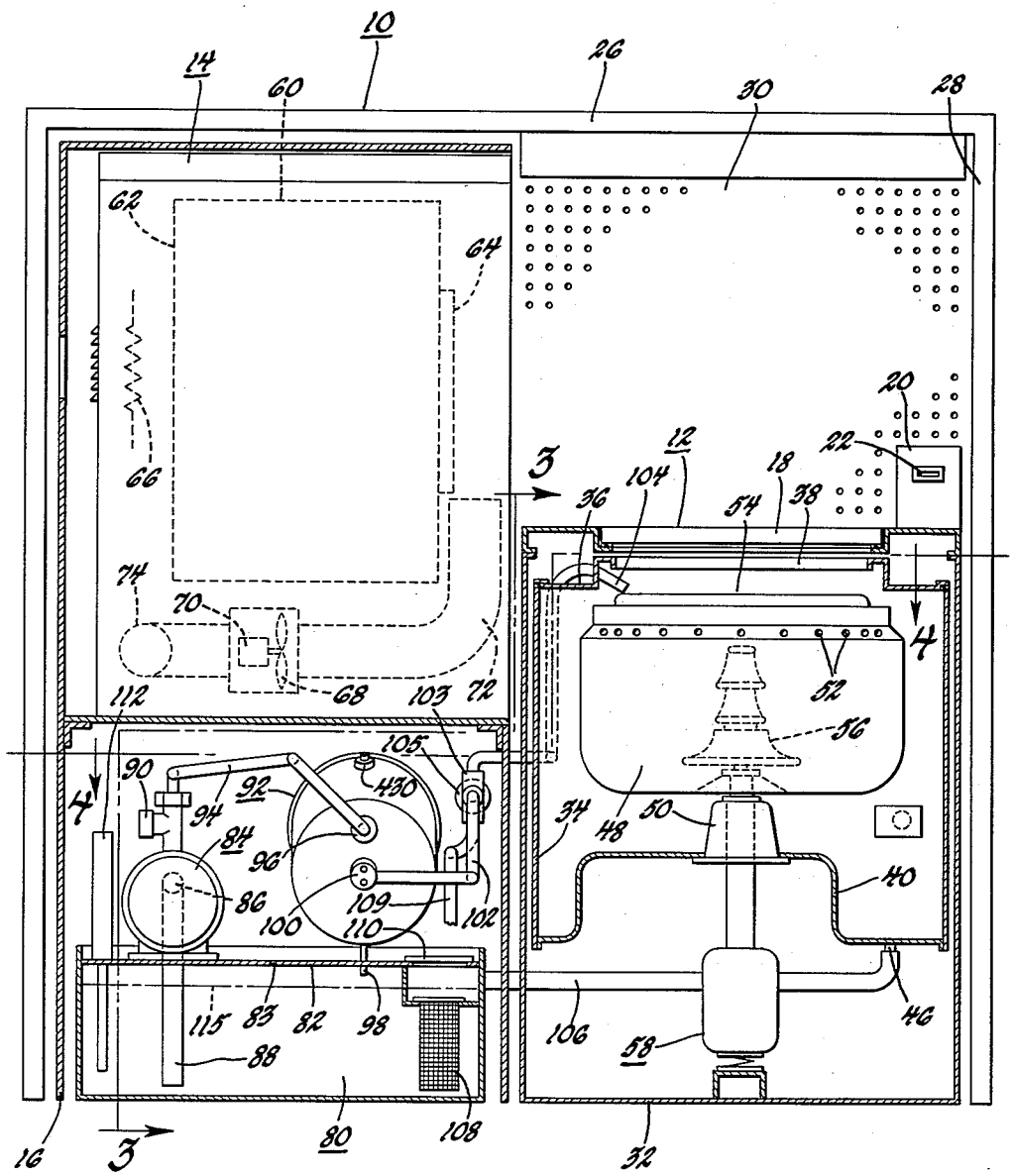
FIGURE 2 is a sectional view taken along line 2—2 in FIGURE 4.

Turning now to FIGURE 2, the washer or agitating apparatus 12 is shown comprised of an outer cabinet 32 in the top wall of which is located the access door 18 hinged along a rear edge thereof. Within the washer cabinet 32, a generally cylindrical imperforate solvent container 34 is disposed which includes a sub-top portion 36 having an access opening 38 in axial alignment with the top access lid 18 of the washer. A bulkhead 40 closes the lower end of the solvent container 34 and includes a drain opening 46 in a lowermost portion thereof. A generally cylindrical spin tub 48 is rotatably supported by a resilient inverted cup-like member 50 on the bulkhead 40 and includes a plurality of circumferentially arranged outflow ports 52 around an upper portion thereof. The tub 48 has a top access opening 54 which aligns with the openings 18 and 38 immediately above. Within the spin tub 48, an agitator 56 is adapted for vertical reciprocation. A motor driven agitating and spinning mechanism is shown generally at 58 and is adapted to vertically reciprocate the agitator 56 when operated in one manner and to rotate or spin the tub 48 when rotated in another manner. By way of suggesting one suitable agitating and spinning mechanism such as 58 but not by way limiting this invention, reference may be had to the patent to Clark 2,422,395, issued June 17, 1947.

The clothes dryer 14 is a conventional single pass circulating air dryer substantially like that taught in the patent to Whyte 2,843,945 issued July 22, 1958. The dryer includes a horizontally rotatable tumbling drum 60 having a perforate rear wall 62 and a front access opening 64 in alignment with the dryer door 24. A drying heater 66 is disposed adjacent the perforate rear wall 62 of the tumbling drum and adapted to be energized for drying clothes within the tumbling drum. During operation of the heater 66 and rotation of the tumbling drum 60, air is circulated by a fan shown generally at 68 driven by a motor 70 which may also be connected through a conventional pulley system for rotating the tumbling drum 60. The fan 68 is connected with the access opening 64 by way of a front duct 72, said front duct being exhausted by the fan through an exhaust duct 74 connected behind the dry cleaning cabinet to the outside vent system seen in FIGURE 4. The dryer includes a push button 76 (FIGURE 1) for initiating a predetermined drying cycle only after a wash cycle has been concluded—an interlock arrangement described more fully in the copending application Serial No. 105,733 serving to prevent the operation of the dryer unless there has first been a washing cycle.

Figure 3:
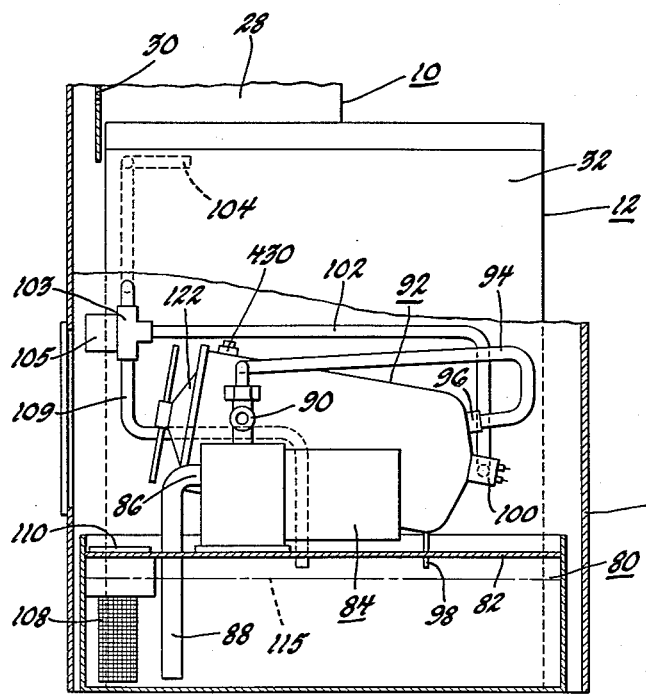
FIGURE 3 is a fragmentary sectional view, partly in elevation, taken along 3—3 in FIGURE 2 to show the filter arrangement of this invention.
Figure 4:
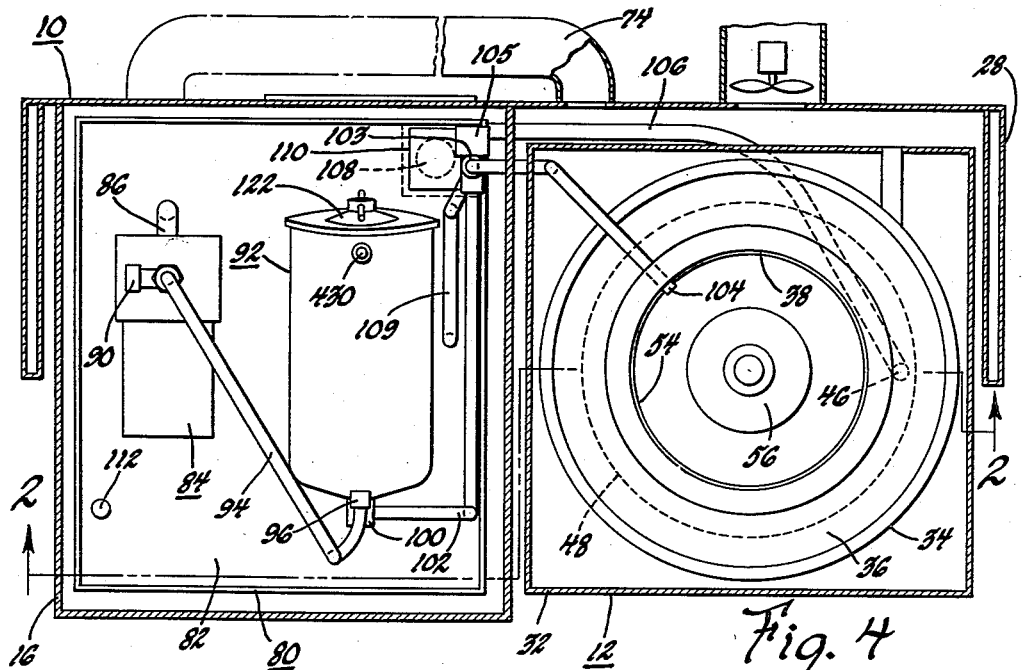
FIGURE 4 is a sectional view, partly in elevation, taken along line 4—4 in FIGURE 2.

The circulating system for a dry cleaning fluid or solvent, such as perchloroethylene (a somewhat toxic dry cleaning fluid) or Valclene (a non-toxic dry cleaning fluid made by the DuPont Corporation) will now be described with reference to FIGURES 2, 3 and 4. The main components of the circulating system include a sump 80 having a top wall 82 with an air vent and spill-over return 83. Resting on the sump top wall 82 is a pump 84 which has its inlet 86 connected through a dip tube 88 to the bottom of the sump 80. A pressure valve 90 on the outlet side of the pump 84 indicates pressures in the system. A filter 92 is adapted to receive the output of the pump through a sloped conduit 94 which connects to the inlet 96 of the filter. The filter 92 is positioned angularly in the filter compartment 16 such that an air bleed and gravity drain 98 extending through the sump wall 82 will substantially drain the filter of solvent when the dry cleaning system is shut down. At one end of the filter, an outlet fitting 100 connects by way of a conduit 102 through a three-way valve 103 to the tub access opening 54—a terminal portion 104 of the conduit 102 overlying the top of the spin tube 48. The three-way valve 103 may be controlled by a solenoid 105 into a first position connecting the filter outlet 100 to the spin tub 48 (solenoid energized) and a second postion connecting the filter outlet 100 to a sump return line 109 (solenoid deenergized). Completing the circualting system is a conduit 106 which connects to the drain outlet 46 of the water container 34. This conduit 106 enters the sump 80 by way of a button trap 108, access to which is gained through a removable lid 110 for cleaning this trap device as well as for adding additional solvent to the system. A sight glass 112 or other suitable means may be used for providing a visual indication of the dry cleaning fluid level 115 in the sump 80.

When the pump 84 is first started, the surge of solvent tends to loosen some of the carbon from the filter 92. In order to prevent the carbon particles from reaching the tub 48, the three-way valve 103 is included in the supply line 102 between the filter and the tub. Thus, with solenoid 105 deenergized, the solvent may be returned to the sump 80 through the by-pass pipe 109 for a brief initial period after the pump 84 is energized until the solvent has been decontaminated or filtered of the loose particles.

The fluid circulation system operates as follows. The 84 draws dry cleaning fluid or solvent from the sump 80 through the dip tube 88. This dry cleaning fluid, cleaned of large objects by the trap 108, is forced through the conduit 94 to the filter 92. The filter, which will be described more fully hereinafter, is effective to filter small solids, solubles and carbon from the dry cleaning fluid. After the aforesaid initial period in which the three-way valve 103 returns the solvent to the sump, the valve is actuated by energizing solenoid 105 and the filtered dry cleaning fluid is then discharged from the filter by way of the conduit 102 and its end 104 into the spin tub 48. When the level of dry cleaning fluid within the tub reaches the outflow ports 52, the dry cleaning fluid will overflow into the solvent container 34 and will return by gravity through the conduit 106 to the sump 80—the button tray 108 intercepting its flow to remove large objects from the fluid.

Figure 5:
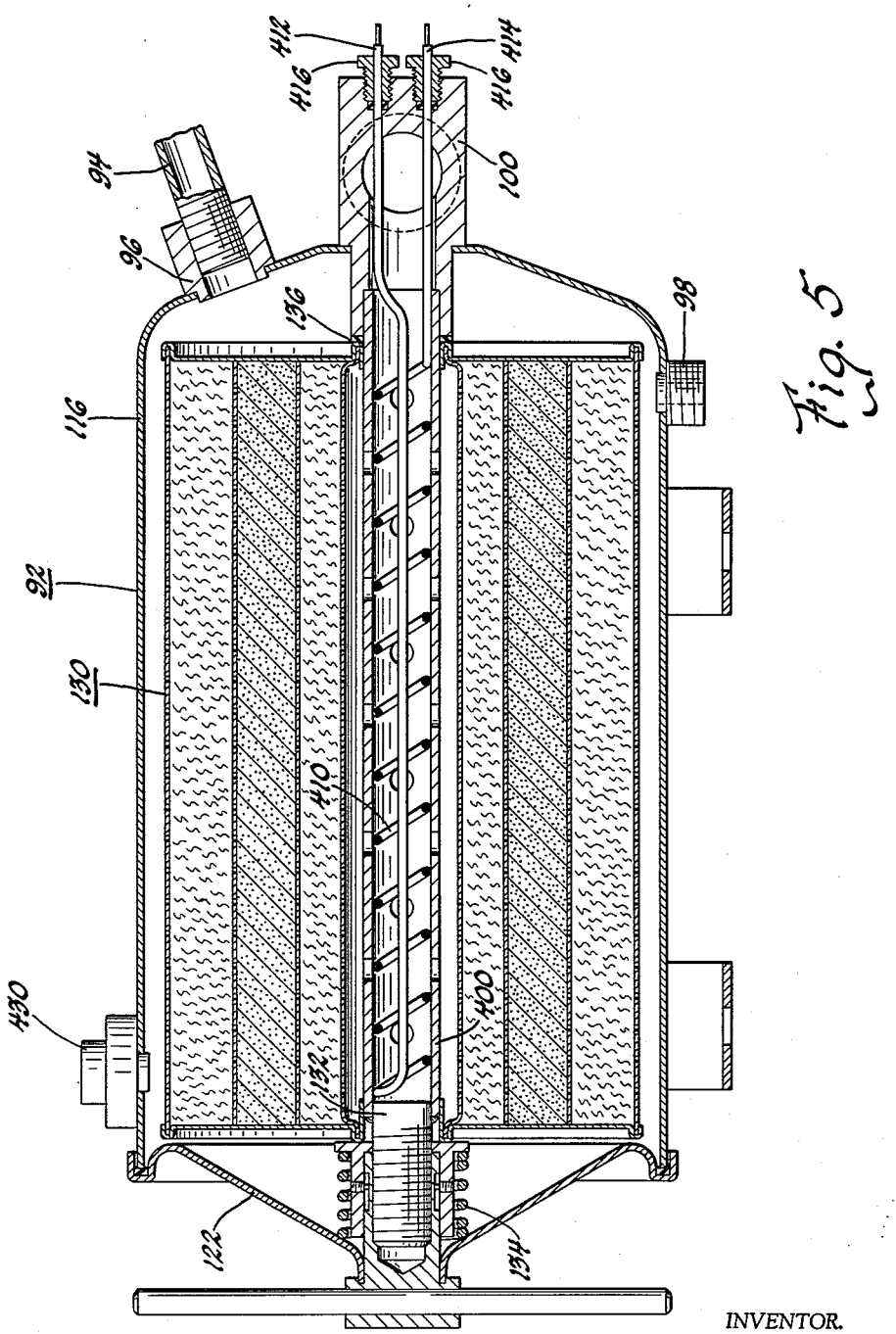
FIGURE 5 is a sectional view of the replaceable filter unit of this invention.

The construction of the filter 92 is best seen in FIGURE 5 wherein the filter casing 116 is adapted to contain a removable throw-away filter element shown generally as 130 to include three concentric annular layers of sisal and felt, carbon and sisal and felt substantially equivalent to the filter cartridge 10 of the copending application. This throw-away element 130 is retained in the filter casing 116 by the removable door or cover 122 which is retained to the casing through an adjustable shaft 132 threadedly engaged with the outlet fitting 100 at the closed end of the filter casing by means of a perforated heater conduit 400 to which the shaft 132 is attached. A spring fitting 134 serves to maintain a constant bias on the replaceable element 130 to provide an effective seal of the filter element at its juncture 136 with the outlet of the filter casing. The foregoing description of the filter is believed to suffice for the purpose of this invention. Additional details of the filter construction may be found in the commonly assigned copending application Serial No. 105,733, filed April 26, 1961.

The operation of the washer 12 is controlled by a conventional pulsatingly advancing timer having a timer motor 236 which operates a plurality of cam actuated switch blades. More particularly, a coin-operated main line switch 238 serves to energize the washer circuit and the clothes dryer interlock circuit, as described more particularly in the aforementioned copending application.

Figure 6:
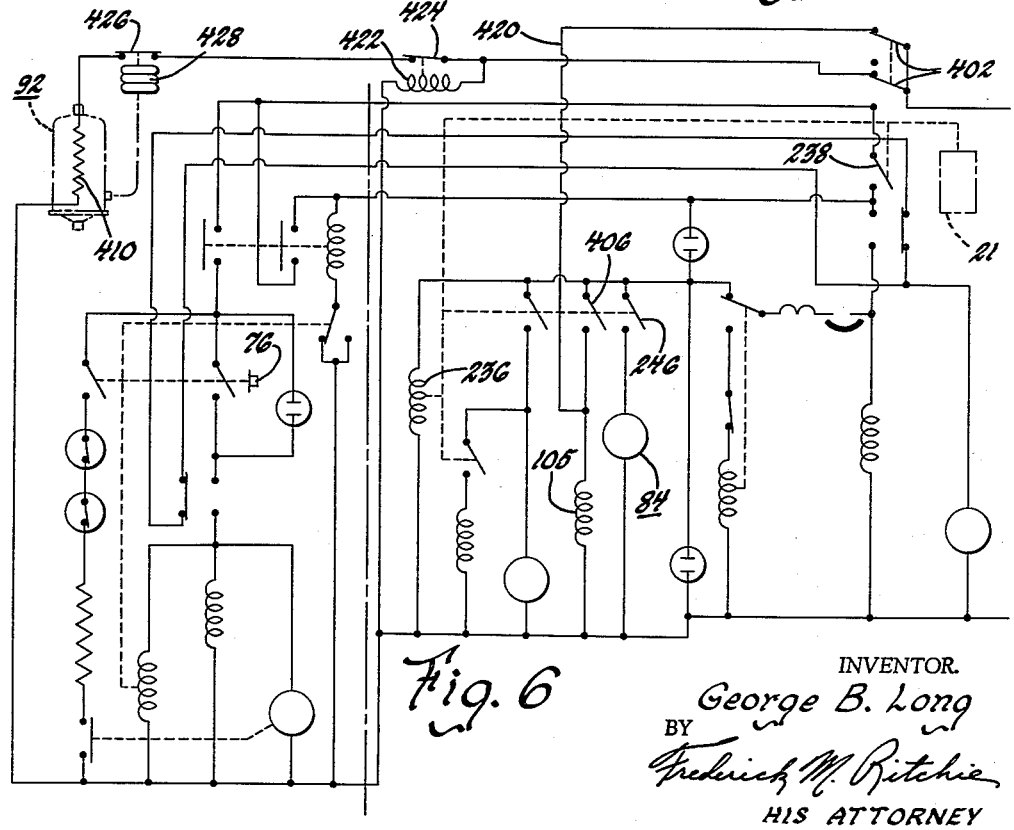
FIGURE 6 is a schematic diagram for the control of this invention.

In accordance with the concepts of this invention and with reference to FIGURE 6 a double pole, double throw master switch 402 is provided which may be switched from a system OFF position (shown in FIGURE 6) and a system ON position wherein the washer and dryer are operable whenever coins are deposited at 21. It is contemplated that an attendant for the coin-operated dry cleaning establishment will move the switch 402 to the ON position at the start of the day. Then, as coins are deposited in the mechanism 21 to close the timer switch 238, a timed cycle will be initiated and the components shown in FIGURE 6 controlled as taught in the aforementioned copending application.

In the circuit of this invention FIGURE 6 includes the solenoid 105 which, when energized, actuates the three-way valve 103 to a position wherein the pump 84 may pump solvent through the filter to the spin tub. In this regard the timer motor 236 sequentially controls a cam actuated switch 406 to energize the valve solenoid 105 a predetermined time interval after the cam actuated switch 246 has been closed to start the pump 84. The duration of this time interval must be sufficient to facilitate the removal of carbon particles from the solvent by recirculating the solvent between the sump and the filter. When the timer switch 406 is closed, the valve 103 is actuated to direct the clean solvent to the tub. The copending application describes an overflow wash during agitation wherein the solvent is continuously pumped to the tub. Therefore solenoid 105 will remain energized all during the period that clothes are being agitated in the tub 48.

Another concept of this invention pertains to a heat induced vaporization for minimizing the waste of solvent in the throw-away fiilter cartridge. As noted hereinbefore, the filter 92 includes a disposable cartridge 130 which soaks up a considerable quantity of solvent. Solvents such as perchlorethylene are expensive so it is desirable to reclaim as much of the solvent as possible before the cartridge is removed. For this purpose the hollow center shaft 400 in the filter container is adapted to receive a suitable heating element 410 such as a $3/16$ inch tubular sheathed heater of approximately 150 watts. Terminal portions 412, 414 extend through heater seals 416 in the outlet fitting 100.

Although the heater 410 is shown preferably centrally disposed in the filter, it has been found that the convolutions of the heater may embrace and entwine the exterior of the filter casing with satisfactory vaporization results.

A control circuit for the heater is shown in FIGURE 6 and includes a by-pass line 420 to the solenoid 105 so that the equipment sequence timer 236 may remain deenergized during the filter heating period. A heater timer motor 422 operates to open a switch 424 to terminate the heating period after a predetermined time interval and a protective thermal switch 426 is included in the line to open the circuit in case the filter overheats. More particularly, a bellows 428 is connected to a pressure tap 430 in the filter casing to reflect pressure build up in the filter.

In operation, let us assume the attendant is closing the shop for the night. He will throw the switch 402 to the OFF position shown in FIGURE 6. In doing so the solvent vaporization circuit is energized. The heater timer 422 starts to time the heating interval and the heater 410 is energized inside the filter. Note that the solenoid 105 is energized simultaneously with the heater circuit. This causes the three-way valve 103 to open the filter to the open ended conduit 102, thereby to facilitate the gravitation of the vapor produced to the cooler parts of the system. As the solvent vapor rises to the sloped relatively cool conduits 94 or 104, it will condense and run back to the sump or tub respectively. The timed interval preset at the timer 422 will be that necessary to substantially completely dry out the filter cartridge. Then when the attendant opens the shop the next time, he can remove the spent and dried cartridge 130 and replace it with another. At the same time the switch 402 will be thrown ON to condition the dry cleaning apparatus for operation.

It should now be seen that an improved solvent system has been devised to use with dry cleaning equipment having a throw-away filter cartridge. Entrapped solvent is vaporized from the cartridge condensed and returned to the system before the cartridge is disposed of. A considerable savings in solvent usage is thus realized. Further, a by-pass arrangement has been taught for this equipment to prevent carry-over of carbon particles to the tub during start up. Solvent is recirculated between the filter and the sump until clean solvent only is available for distribution to the tub.

While the embodiments of the present invention as herein disclosed, constitute preferred forms, it is to be understood that other forms might be adopted.

What is claimed is as follows:

1. A dry cleaner comprising a vertical spin tub for containing a solvent and having a top opening and a plurality of circumferentially arranged outflow ports, a sump for storing said solvent and having means in communication with said outflow ports, means for selectively rotating said spin tub to return said solvent from said tub to said sump, a filter for cleaning said solvent and having an inlet and an outlet below said top opening, said filter enclosing a replaceable filter cartridge, solvent circulating means in communication with said sump and having an outlet conduit upwardly slopingly connected to said filter inlet, said filter having a heater for selectively vaporizing the solvent from said cartridge, a three-way valve means having a valve inlet connected to said filter outlet and first and second valve outlets, a supply conduit connecting said first valve outlet to the top opening of said tub, a by-pass conduit connecting said second valve outlet to said sump, solenoid means for controlling said valve means in a first manner when energized to open said valve inlet to said first valve outlet and in a second manner when deenergized to open said valve inlet to said second valve outlet, first switch means for energizing said circulating means to circulate said solvent between said sump and said filter to clean said solvent, second switch means operative after said circulating means is energized for energizing said solenoid means to cause said circulating means to circulate said solvent to said tub in an amount sufficient to overflow said tub, and means for shunting said first and second switch means to energize said solenoid means and said heater to drain said supply conduit and said outlet conduit and to vaporize said solvent from said filter cartridge.

2. A dry cleaner comprising a tub for containing a solvent, a sump for storing said solvent and having means in communication with said tub, means for returning said solvent from said tub to said sump, a filter for cleaning said solvent and having an inlet and an outlet, solvent circulating means in communication with said sump and having an outlet conduit connected to said filter inlet, said filter having a replaceable filter cartridge and a heater for selectively vaporizing the solvent from said cartridge, a three-way valve means having a valve inlet connected to said filter outlet and first and second valve outlets, a supply conduit connecting said first valve outlet to said tub, a by-pass conduit connecting said second valve outlet to said sump, means for controlling said valve means in a first manner to open said valve inlet to said first valve outlet and in a second manner to open said valve inlet to said second valve outlet, first switch means for energizing said circulating means to circulate said solvent between said sump and said filter to clean said solvent while said control means is actuated in said second manner, second switch means operative after said circulating means is energized for actuating said control means in said first manner while said circulating means is energized to cause said circulating means to circulate said solvent to said tub, and means for shunting said switch means to actuate said control means in said second manner and to energize said heater to drain said supply conduit and said outlet conduit and to vaporize said solvent from said filter cartridge.

3. A dry cleaner comprising a tub for containing a solvent, a sump for storing said solvent and having means in communication with said tub, means for returning said solvent from said tub to said sump, a filter for cleaning said solvent and having an inlet and an outlet, solvent circulating means in communication with said sump including conduit means connected to said filter in a manner adapted to facilitate solvent circulation from said inlet to said outlet, said filter having a replaceable filter cartridge and a heater for selectively vaporizing the solvent from said cartridge, a three-way valve means having a valve inlet in communication with said filter outlet and first and second valve outlets, a supply conduit connecting said first valve outlet to said tub, a by-pass conduit connecting said second valve outlet to said sump, means for controlling said valve means in a first manner to open said valve inlet to said first valve outlet and in a second manner to open said valve inlet to said second valve outlet, first means for energizing said circulating means to circulate said solvent between said sump and said filter to clean said solvent while said control means is actuated in said second manner, second means operative after said circulating means is energized for actuating said control means in said first manner while said circulating means is energized to cause said circulating means to circulate said solvent to said tub, and means for overriding said second means to actuate said control means in said first manner and to energize said heater to drain said supply conduit and said outlet conduit means and to vaporize said solvent from said filter cartridge.

4. A dry cleaner comprising a tub for containing a solvent, a sump for storing said solvent and having means in communication with said tub, means for returning said solvent from said tub to said sump, a filter for cleaning said solvent and having an inlet, an outlet and a gravity drain communicating with said sump, solvent circulating means in communication with said sump including conduit means connected to said filter in a manner to facilitate solvent circulation from said inlet to said outlet, said filter having a replaceable filter cartridge including filter particles, a heater in heat transfer relationship to said filter cartridge, valve means having a valve inlet in communication with said filter outlet and first and second valve outlets, an open end supply conduit connecting said first valve outlet to said tub, a by-pass conduit connecting said second valve outlet to said sump, said valve means being controllable in a first manner to open said valve inlet to said first valve outlet and to close said valve inlet to said second valve outlet and in a second manner to open said valve inlet to said second valve outlet and to close said valve inlet to said first valve outlet, first means for initially energizing said circulating means surgingly to circulate said solvent between said sump and said filter whereby a portion of said filter particles are loosened from said filter cartridge into said solvent and for continuing the energization of said circulating means for an initial period sufficient to clean the loosened filter particles from said solvent and prevent carry over of said filter particles to said tub while said valve means is controlled in said second manner, said valve means after said circulating means is energized for said initial period being controlled in said first manner for a cleaning period while said circulating means is energized to cause said circulating means to circulate said solvent between said tub and said sump, said first means subsequently deenergizing said circulating means to terminate said cleaning period, said valve means after said cleaning period being controlled in said first manner for a drain period while said circulating means is deenergized to cause the solvent in said open end supply conduit and said filter to drain to said sump, and second means operable after said wash period and the draining of said solvent to said sump for energizing said heater for a drying period to vaporize any solvent remaining in said filter cartridge.

5. The dry cleaner of claim 4 wherein said second means includes a timer for deenergizing the heater to terminate said drying period.

6. The dry cleaner of claim 4 wherein said second means includes a protective thermal device for deenergizing the heater under conditions of high temperature.

References Cited in the file of this patent

UNITED STATES PATENTS

| | | |
|---|---|---|
| 1,602,705 | Riley et al. | Oct. 12, 1926 |
| 1,917,096 | Chamberlin | July 4, 1933 |
| 2,101,014 | Angelus et al. | Nov. 30, 1937 |
| 2,301,803 | Davis | Nov. 10, 1942 |
| 2,601,404 | Lasky | June 24, 1952 |
| 2,630,694 | Creswick | Mar. 10, 1953 |
| 2,902,158 | Muller | Sept. 1, 1959 |
| 2,932,961 | Robbins et al. | Apr. 19, 1960 |